US009891892B2

(12) United States Patent
Roelle et al.

(10) Patent No.: US 9,891,892 B2
(45) Date of Patent: Feb. 13, 2018

(54) METHOD AND DEVICE FOR PRODUCING A COMPUTER PROGRAM PRODUCT FOR A MOBILITY DEVICE AND MOBILITY DEVICE

(71) Applicant: Bayerische Motoren Werke Aktiengesellschaft, Munich (DE)

(72) Inventors: Christopher Roelle, Groebenzell (DE); Markus Strassberger, Wartenberg (DE); Benjamin Weyl, Munich (DE); Timo Kosch, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 338 days.

(21) Appl. No.: 14/710,902

(22) Filed: May 13, 2015

(65) Prior Publication Data

US 2015/0242190 A1    Aug. 27, 2015

Related U.S. Application Data

(63) Continuation of application No. PCT/EP2013/073134, filed on Nov. 6, 2013.

(30) Foreign Application Priority Data

Nov. 14, 2012  (DE) .................. 10 2012 220 787

(51) Int. Cl.
*G06F 9/44*       (2006.01)
*G06F 3/048*      (2013.01)
(Continued)

(52) U.S. Cl.
CPC .............. *G06F 8/34* (2013.01); *G06F 3/0482* (2013.01); *G06F 3/04842* (2013.01); *G06F 8/20* (2013.01);
(Continued)

(58) Field of Classification Search
CPC . G06F 8/20; G06F 8/34; G06F 3/0482; G06F 3/04842; H04W 4/001; H04W 4/046; H04L 67/34
See application file for complete search history.

(56) References Cited

U.S. PATENT DOCUMENTS 6,618,668 B1 * 9/2003 Laird ................. G06Q 10/08
                                                340/994
8,731,822 B2 * 5/2014 Vogedes ............ G01C 21/3629
                                                455/246.1

(Continued)

FOREIGN PATENT DOCUMENTS

DE    10 2012 006 369 A1    10/2012

OTHER PUBLICATIONS

International Search Report dated Mar. 18, 2014 (Two (2) pages).

*Primary Examiner* — Marina Lee
(74) *Attorney, Agent, or Firm* — Crowell & Moring LLP (57) ABSTRACT

An assignment of at least one state variable to a respective graphic object is carried out as a function of a user input. An assignment of a respective vehicle parameter or personal characteristic to one state variable respectively, which is assigned to the respective graphic object, is carried out as a function of a user input. This takes place with the inclusion of a respective assignment function, which represents an imaging rule of the respective vehicle parameter or personal characteristic onto the respective state variable.

The computer program product is generated in an automated manner, specifically such that it is designed for generating a signalizing signal during its run, which signalizing signal is a function of the respective currently provided value of the respective vehicle parameter or personal characteristic, which is assigned to the respective graphic object, and which signalizing signal is designed for signalizing the graphic object or objects corresponding to the respective assignment (Continued)

function relative to the respective currently provided value of the respective vehicle parameter or personal characteristic on an imaging system.

20 Claims, 2 Drawing Sheets

(51) Int. Cl.
  *H04L 29/08* (2006.01)
  *H04W 4/00* (2009.01)
  *H04W 4/04* (2009.01)
  *G06F 3/0482* (2013.01)
  *G06F 3/0484* (2013.01)

(52) U.S. Cl.
  CPC ............ H04L 67/34 (2013.01); H04W 4/001 (2013.01); H04W 4/046 (2013.01)

(56) References Cited

U.S. PATENT DOCUMENTS

| | | | |
|---|---|---|---|
| 2005/0131585 A1* | 6/2005 | Luskin | H04L 67/34 701/1 |
| 2006/0293850 A1* | 12/2006 | Ahn | G01C 21/3415 701/469 |
| 2007/0126604 A1* | 6/2007 | Thacher | G01C 21/26 340/995.13 |
| 2011/0130916 A1* | 6/2011 | Mayer | G07C 5/008 701/31.4 |
| 2012/0226440 A1* | 9/2012 | Nagda | G01C 21/26 701/465 |
| 2013/0184981 A1* | 7/2013 | Vogedes | G01C 21/3629 701/400 |
| 2013/0302758 A1* | 11/2013 | Wright | G07C 5/008 434/65 |
| 2015/0242190 A1* | 8/2015 | Roelle | H04L 67/34 717/105 |
| 2016/0127664 A1* | 5/2016 | Bruder | G01S 7/4816 463/30 |

* cited by examiner

METHOD AND DEVICE FOR PRODUCING A COMPUTER PROGRAM PRODUCT FOR A MOBILITY DEVICE AND MOBILITY DEVICE

CROSS REFERENCE TO RELATED APPLICATIONS

This application is a continuation of PCT International Application No. PCT/EP2013/073134, filed Nov. 6, 2013, which claims priority under 35 U.S.C. § 119 from German Patent Application No. 10 2012 220 787.2, filed Nov. 14, 2012, the entire disclosures of which are herein expressly incorporated by reference.

BACKGROUND AND SUMMARY OF THE INVENTION

The invention relates to a method and to a device for producing a computer program product for a mobility device. It further relates to a mobility device.

It is known to carry out certain configurations for the vehicle externally of the latter, for example, at a PC. An example is a corresponding route planning which can then, as required, be indirectly transmitted to the vehicle.

It is desirable to provide information also with respect to the vehicle in a manner that is as varied as possible.

It is an object of the invention to create a simple and comfortable method and a corresponding device for producing a computer program product for a mobility device. According to a further aspect, it is an object of the invention to create a simple and comfortable mobility device.

This object is achieved by the characteristics of the independent claims. Advantageous further developments are characterized in the subclaims.

According to a first aspect, the invention is characterized by a method and a corresponding device for producing a computer program product for a mobility device. One or more graphic objects are provided. One or more state variables are provided as being assignable to the respective graphic object. State variables may, for example, be a variable representing the size of the graphic object and/or a color and/or a color combination. Furthermore, one or more vehicle parameters or personal characteristics are provided. An assignment of at least one of the state variables to the respective graphic object is carried out as a function of a user input. Furthermore, an assignment of a respective vehicle parameter or personal characteristic to one state variable respectively, which is assigned to the respective graphic object, is carried out as a function of a user input, specifically including a respective assignment function, which represents an imaging rule of the respective vehicle parameter or personal characteristic onto the respective state variable.

The computer program product is generated in an automated manner, specifically such that it is designed for generating a signalizing signal during its run, which signalizing signal is a function of the respective currently provided value of the respective vehicle parameter or personal characteristic, which is assigned to the respective graphic object, and which signalizing signal is designed for signalizing the graphic object or objects corresponding to the respective assignment function relative to the respective currently provided value of the respective vehicle parameter or personal characteristic on an imaging system.

In this manner, a particularly customer-value-related individualization easily becomes possible in the display of the respective vehicle parameter or personal characteristic, specifically represented by the graphic object and the respectively assigned state variable. Thus, a particularly exclusive display of this information becomes possible, and the respective graphic objects can have a correspondingly artistically sophisticated design. This further makes it possible that the information content can be recognized only by persons for whom it is intended when only they know the respective assignment and also the assignment function.

According to a second aspect, the invention is characterized by a method and a corresponding device for producing the computer program product for a mobility device. One or more three-dimensional objects are provided. One or more state variables are provided as being assignable to the respective three-dimensional object. Examples of such state variables are, for example, a respective angle relative to a specified reference angle and/or a respective position relative to a reference position. In addition, one or more vehicle parameters and/or personal characteristics are provided. An assignment is carried out of at least one of the state variables to the respective three-dimensional object as a function of a user input. An assignment of a respective vehicle parameter or personal characteristic to one state variable respectively, which is assigned to the respective three-dimensional object, is carried out as a function of a user input, specifically including a respective assignment function which represents an imaging rule of the respective vehicle parameter or personal characteristic onto the respective state variable.

The computer program product is generated in an automated manner, specifically such that it is designed for generating a control signal during its run, which control signal is a function of the respective currently provided value of the respective vehicle parameter or personal characteristic, which is assigned to the respective three-dimensional object, and which control signal is designed for controlling the three-dimensional objects corresponding to the respective assignment function relative to the respective currently provided value of the respective vehicle parameter or personal characteristic.

According to the second aspect, corresponding effects and advantages are obtained analogous to the first aspect with the difference that, instead of referring to the respective graphic object, they refer to the respective three-dimensional object. The respective three-dimensional objects can have a correspondingly artistically sophisticated design and can therefore be provided exclusively for the respective customer.

According to a third aspect, the invention is characterized by a method and a corresponding device for producing a computer program product for a mobility device, wherein one or more audio objects are provided. One or more state variables are provided as being assignable to the respective audio object. One or more vehicle parameters and/or personal characteristics are provided. An assignment is carried out of at least one of the state variables to the respective audio object as a function of a user input. Furthermore, an assignment of a respective vehicle parameter or personal characteristic to one state variable respectively, which is assigned to the respective audio object, is carried out as a function of a user input, specifically including a respective assignment function, which represents an imaging rule of the respective vehicle parameter or personal characteristic onto the respective state variable.

The computer program product is generated in an automated manner, specifically such that it is designed for generating a signalizing signal during its operation, which signalizing signal is a function of the respective currently provided value of the respective vehicle parameter or personal characteristic, which is assigned to the respective audio object, and which signalizing signal is designed for signalizing the audio object or objects corresponding to the respective assignment function relative to the respective currently provided value of the respective vehicle parameter or personal characteristic by means of a sound-providing device.

With respect to its effects and advantages, the third aspect corresponds to that of the first and also the second aspect, in which case, instead of the graphic objects, corresponding audio objects are provided. Also the audio object or objects can be correspondingly exclusively and individually further developed for the respective customer.

According to a fourth aspect, the invention is characterized by a method and a corresponding device for producing a computer program product for a mobility device. One or more light objects are provided. In addition, one or more state variables are provided as being assignable to the respective light object. Furthermore, one or more vehicle parameters and/or personal characteristics are provided. An assignment is carried out of at least one of the state variables to the respective light object as a function of a user input. An assignment of a respective vehicle parameter or personal characteristic to one state variable respectively, which is assigned to the respective light object, is carried out as a function of a user input, specifically including a respective assignment function, which represents an imaging rule of the respective vehicle parameter or personal characteristic onto the respective state variable.

The computer program product is generated in an automated manner, specifically such that it is designed for generating a signalizing signal during its run, which signalizing signal is a function of the respective currently provided value of the respective vehicle parameter or personal characteristic, which is assigned to the respective light object, and which signalizing signal is designed for signalizing the light object or objects corresponding to the respective assignment function relative to the respective currently provided value of the respective vehicle parameter or personal characteristic by means of a light-generating device.

With respect to its effects and advantages, the fourth aspect corresponds to those of particularly the first but also the other aspects, in which case, instead of the graphic object or objects, the light object or objects are provided.

The light object or objects may be corresponding light installations. Thus, the light object or objects may, for example, be generated by means of one or more lasers.

According to a further aspect, the invention is characterized by a mobility device which has the computer program product that is produced according to one of the first to fourth aspects.

According to a further development, the respective assignment function comprises at least one function parameter, which is determined in an automated manner as a function of the respective value of the domains of the respective state variable and the respective vehicle parameter or personal characteristic. In this fashion, a corresponding imaging of the respective value domains of the respective vehicle parameter or personal characteristic on those of the respective state variable is easily made possible. It can thereby be ensured in a simple manner that a corresponding signalizing or controlling corresponding to the respective aspect can be implemented in a simple and reliable manner.

According to a further advantageous development, the respective assignment function comprises at least one function parameter which is specified as a function of a user input. In this connection, it is checked whether the respective domain of the respective vehicle parameter or personal characteristic is imaged within the value domain of the respective state variable by means of the respective assignment function. Only if this is so, will the function parameter or parameters be classified as being valid and otherwise will be rejected. A reliable signalizing or controlling thereby becomes possible according to the respective aspect.

According to a further advantageous development, the respective vehicle parameter is representative of one of the following: position of the vehicle, distance of the vehicle from a reference position, the charging state, vehicle status and operating variable of the vehicle.

According to a further advantageous development, the respective personal characteristic is representative of a position of the respective person.

The first to fourth aspects and their further developments can be mutually combined in an arbitrary manner.

Embodiments of the invention will be explained in detail in the following by means of the schematic drawings.

Other objects, advantages and novel features of the present invention will become apparent from the following detailed description of one or more preferred embodiments when considered in conjunction with the accompanying drawings.

BRIEF DESCRIPTION OF THE DRAWINGS

Elements of the same construction or function are marked by the same reference symbols in all figures.

DETAILED DESCRIPTION OF THE DRAWINGS

A production device 1 (FIG. 1) is designed for producing a computer program product for a mobility device 3. The mobility device 3 comprises particularly a data and program memory and an arithmetic unit. The computer program product can be stored in the data and program memory and run during the operation of the mobility device 3. In principle, the computer program product can be stored in the form of corresponding program instructions in the data and program memory.

Figure 1:
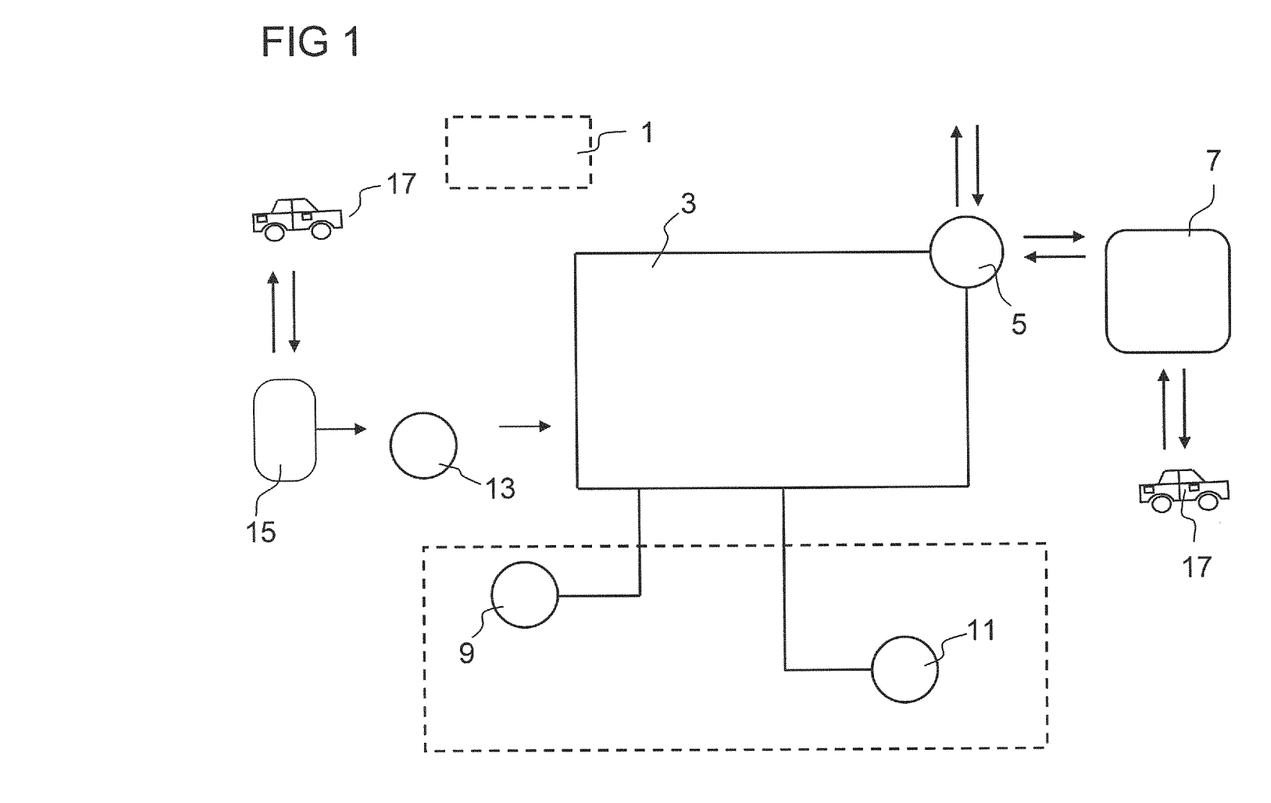
FIG. 1 is a view of a block diagram of various components.

Furthermore, an interface 5 is assigned to the mobility device, which interface 5 may particularly be a communication interface, which may be designed, for example, for the communication with a cellular network and/or the Internet.

The mobility device 3 can thereby communicate by means of the interface 5, for example, with the Internet and thus, for example, also with a backend server 7.

An imaging device, such as a monitor, may, for example, be assigned to the mobility device 3. In this case, it is designed for generating a signalization signal, by means of which video screen contents can be signalized on the imaging device.

As an alternative or in addition, one or more three-dimensional objects can be assigned to the mobility device, which three-dimensional objects can be correspondingly movably controlled by means of respective corresponding actuators. In this case, the mobility device 3 is designed for generating corresponding control signals for the purpose of driving the actuators. In this context, corresponding final stages can then also be provided in the mobility device 3.

Furthermore, as an alternative or in addition, a sound-providing device can be assigned to the mobility device, which sound-providing device may comprise, for example, one or more loudspeakers. In this case, the mobility device 3 is designed for generating a signalization signal, by which corresponding sounds are generated.

As an alternative or in addition, the mobility device 3 may also comprise one or more light-generating devices. These may, for example, be a laser or another light source.

The production device 1 may also be called a device for producing the computer program product for the mobility device 3. According to a first aspect, one or more graphic objects are provided by means of the production device 1. The graphic objects may basically be arbitrarily specified. They may, for example, be specified in an artistically sophisticated and individualized manner. One or more state variables may be provided as being assignable to the respective graphic object. Furthermore, one or more vehicle parameters and/or personal characteristics are provided. An assignment of at least one of the state variables to the respective graphic object is carried out as a function of a user input. An assignment of a respective vehicle parameter or personal characteristic to one state variable respectively, which is assigned to the respective graphic object, is carried out as a function of a user input. This takes place with the inclusion of a respective assignment function, which represents an imaging rule of the respective vehicle parameter or personal characteristic onto the respective state variable. In this case, the computer program product is then generated in an automated manner in the production device 1, which computer program product is designed for generating a signalization signal during its run, which signalization signal is a function of the respective currently provided value of the respective vehicle parameter or personal characteristic, which is assigned to the respective graphic object, and which signalization signal is designed for signaling the graphic object or objects corresponding to the respective assignment function relative to the respective currently provided value of the respective vehicle parameter or personal characteristic on the imaging device 19. The respective vehicle parameter is, for example, representative for one of the following: position of the vehicle 17, distance of the vehicle 17 from the reference position, charging state, vehicle status, operating variable of the vehicle. The respective personal characteristic is representative, for example, of a position of a respective person. The respective state variable is, for example, a variable representative of a size of the graphic object, as, for example, in the case of a circular surface, of its diameter. However, it may also be a color and therefore, with respect to its value domain, cover a specified color spectrum. Furthermore, it may also be representative of a position in the case of its display on the imaging unit.

The respective assignment function comprises at least one function parameter. The production device may be designed for determining the at least one function parameter in an automated manner as a function of respective value domains of the respective state variable and of the respective vehicle parameter or personal characteristic. As an alternative or in addition, the production device may be designed such that the function parameter is specified as a function of a user input and that it is checked whether the respective value domain of the respective vehicle parameter or personal characteristic is imaged within the value domain of the respective state variable by means of the respective assignment function. Only if this is so, will the function parameter or parameters be classified as valid and otherwise be rejected. In this case, as required, the user will be requested to input again.

According to further aspects, instead of the graphic object or objects, one or more three-dimensional objects, according to a further aspect, one or more audio objects and according to a further aspect, one or more light objects may be provided. In these cases, the production device is then correspondingly designed for generating corresponding control signals or signalizing signals. In this context, reference is made particularly to the second to fourth aspects of the invention.

However, the aspects may also be arbitrarily combined. The respective computer program product can then be provided to the mobility device in any manner. It may be provided, for example, on a corresponding storage medium, such as a memory card. However, it may also be transmitted in the form of corresponding messages by way of a corresponding communication network. Thus, it can be transmitted, for example, by way of the Internet from the production device 1 to the mobility device.

In addition, an RFID sensor 9 may also be assigned to the mobility device, which RFID sensor 9, as an alternative or in addition, may also be designed in the form of an NFC element, NFC being an abbreviation for near field communication.

Furthermore, an optical person detection unit 11 may also be assigned to the mobility device. As an alternative or in addition, a key reader 13 for a key 15 can be assigned to it. The key 15 may particularly be assigned to the vehicle 17. By means of FIG. 2, two different display contents of the imaging device 19 are illustrated. In this case, a first graphic object 21, a second graphic object 23 and a third graphic object 25 are illustrated. For example, the respective position of the respective first to third graphic object 21 to 25 can represent the respective position of a person, who may, for example, in each case be one of the family members. Furthermore, one of the graphic objects may also represent a distance to a reference position with respect to its position in the display of the imaging unit, which reference position may, for example, be the position of the mobility device 19.

Figure 2:
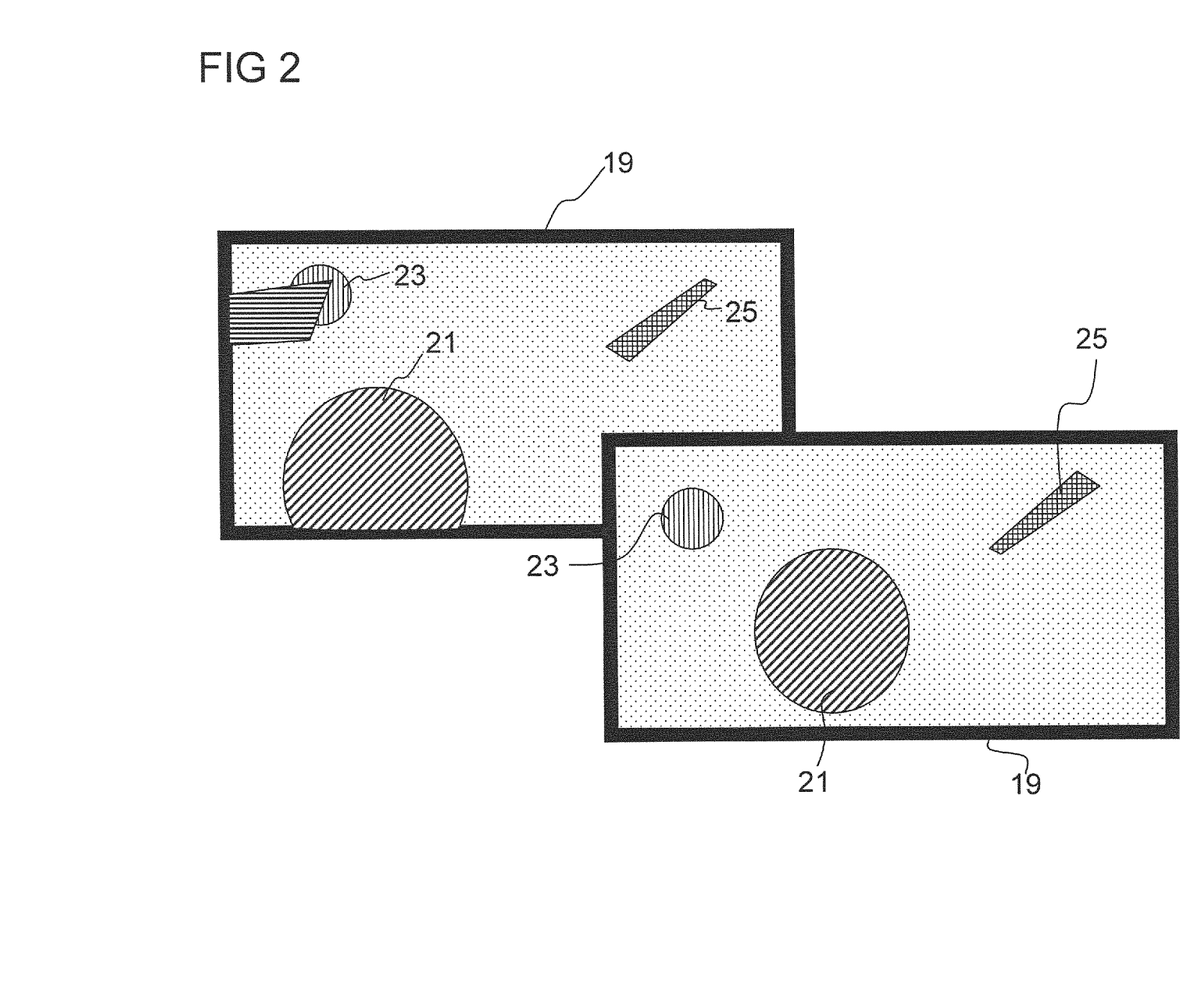
FIG. 2 is a view of an imaging device of a mobility device in two different output states.

Furthermore, for example, the background color may contain additional information, such as weather information, and may therefore, for example, in the left upper video screen display, represent a slightly cloudy sky and in the right lower display represent a clear sky. In addition, by means of the first display content, it may be recognizable for the respective user, for example, that slight traffic is to be expected; that it is, for example, 2 p.m., and that the respective vehicle of interest is situated at a distance of approximately 2 kilometers.

By means of the second display content, it may, for example, be represented that the sky is clear, that it is 7 a.m. and that the vehicle is situated at a distance of approximately 20 kilometers and that the traffic is dense.

The mobility device 3 is designed, for example, as a creative element of an interior decoration and can act as a link between home and mobility/vehicle 17. The mobility device may also comprise a so-called mobility management module or an interface to the latter, which provides current and also predicted relevant context information and recommendations of a current drive or mobility intentions for the current user or a user group, such as a family. This can comprise, for example, an interactive route preview and/or a so-called travel companion and/or a so-called transfer assist.

Optionally, the mobility device 3 may comprise a so-called privacy module or the latter can be assigned to it. This privacy module is designed for forcing the protection of the individual privacy sphere as a function of a current context which may, for example, be represented by known persons in a space or settings and the like. This may take place, for example, by reducing an accuracy to particularly a piece of information which represents a position and/or fading out/filtering out of incoming messages on the basis of sender, content and the like. These may be current privacy measures, as required, while especially taking into account the persons who can currently perceive the mobility device, such as sounds that can be generated by the latter.

In this manner, a so-called EF Preview, functions comprising a travel companion and a transfer assist, can be made available early, for example, before leaving the house or the apartment, in which the mobility device 3 is arranged. Thus, particularly a route preview—also called Welcome—can be available but also a route review—also called Farewell—as well as a current status of the vehicle, particularly also when the vehicle is on the road.

It is therefore, for example, possible to indicate when a specified person, such as the user, will most probably come home or whether an additional person, for example, the driver has started on his trip or whether the gasoline will be sufficient for the round trip, or whether a traffic jam is just forming on the route, and the like.

Adaptions can be made per trip, for example, who is driving—father, mother, children, . . . , —who is coming along—family, alone, colleagues, business partner, . . . what is the destination of the trip—short trip, vacation, business, leisure trip, . . . . Each of these situations can be arbitrarily combined and influences, for example, the music selection, for example, Heavy Metal vs classical, communication filter—superior yes, mother-in-law no, activated address books, email accounts or social networks.

Expansion stages range from a passive representation by means of mobility device—similar to a digital photo frame of the current context—"When does Mama come home?", "How is traffic today?", "When should I start driving so that I will probably arrive at my appointment on time?"—to the interactive mobility device 3, which can also be called gateway, which make it possible to dial different views, preparations and/or retrieve special information and/or carry out configurations. The interaction can take place by way of voice and/or gestures and/or touch/approach.

Furthermore, the mobility device may be designed for granting access to the function or information of other vehicles or persons, provided they have explicitly permitted it in advance. For example, the expected arrival time of individual guests can be displayed or the locations of different persons, such as family members, can be announced. Thus, for example, in the case of three-dimensional objects, these can be further developed in the shape of a "distance clock" relative to different persons, for example, family members. For this purpose, it may be necessary, as required, to expand the privacy module for safeguarding the private sphere of other persons—including a current security concept/implementation. It may further be necessary in this connection to create a possibility for implementing a configuration of the personal privacy setting, particularly with respect to regulating the access to personal data and functions by third parties.

Furthermore, the mobility device 3 may be designed for interacting with a key 15, particularly a vehicle key. A so-called interactive key holder may be provided, offering a holding device for the keys 15. The key 15 is recognized and the user is identified. In this context, an authentication can be carried out by way of a PIN. Personal data, settings and current information will then be displayed to the user, with which he can thereby interact. The data are then synchronized with the vehicle 17, for example, in the backend server.

Furthermore, the mobility device 3 can optionally interact with active objects or other services. Thus, for example, when a smartphone is approaching, which can be detected by way of Bluetooth, a camera, an NFC unit or the like—defined/configured services can be called and/or a synchronization of the appointment calendar can be carried out or, for example, opera tickets, which have an RFID chip identification, are correspondingly detected and are directed to a destinations estimator.

The mobility device 3 can further be designed for generating corresponding light objects. In this context, the respective state variable may be a brightness or color and/or dynamics of a color change. An audio object may, for example, be a corresponding audio file. Furthermore, the mobility device may be designed such that the objects influenced by means of the mobility device 3, thus, for example, graphic objects and/or light objects and/or audio objects and/or three-dimensional objects can be changed by third parties. Thus, for example, by way of a so-called community platform, different motives/interpretations can be established and propagated by other users. For this purpose, a so-called adaption module may be assigned to the mobility device 3. This module is designed particularly for assigning a certain context value, such as an expected arrival time, a tank content, traffic jam, delay and the like, to an action—of conceivable actions of the concrete further development of the mobility device 3—or a change of a light color or the display of an additional layer of a current video screen display.

The mobility device may therefore be mounted, for example, in a living space, but, as an alternative or in addition, be installed, for example, for commercial use. Thus, for example, in a hotel room, in a bathroom mirror of the hotel, in a hotel lobby, at a railroad station/on a platform within the scope of the short-range public transit. The correspondingly commercially operated mobility device should be correspondingly personified in this respect. This means that the user has to authenticate himself, for example, by means of so-called identifications, for example, by password/PIN, name, NFC/Smartphone, secure mobile payment, credit card or by biometric characteristic, for example, face recognition. Furthermore, in this case, an interface to the mobility management module should be present that is visible toward the outside and is secured.

According to a further development of the mobility device, temporarily defined locations of the mobility device 3 can be used by third parties for their own, not necessarily mobility-correlated contents, such as advertising, CMR or touchpoint. For this purpose, the mobility device 3 may be expanded by an advertising module, which fades in contents, for example, in the form of image or sound, according to defined rules which, as required, can be configured by the owner of the mobility device 3.

In particular, also the data and program memory and also the arithmetic unit of the mobility device 3 can be constructed as a modular unit with, for example, the imaging device and/or the three-dimensional object or objects and/or the sound-providing device and/or the light-generating device.

The computer program product 3 may, for example, also be provided as a so-called app or web application. It can therefore be provided particularly in a "virtual" manner.

The mobility device 3 may further be designed for triggering actions of the vehicle 17. It may, for example, be designed for already changing the vehicle 17 into an alerted state in the case of an acknowledgment of a destination or the removal of the key or to precondition it in a suitable manner, thus, for example, by means of an automatic defrosting system and/or an air conditioning function and/or a synchronization of data files, for example, music stream, calendar and the like. Thus, for example, an EF proactive alerting of vehicle systems can take place.

The mobility device 3 is distinguished, particularly with respect to one of the described further developments by the following: a rapid and simple configuration before the start of the trip; an individualized adaption of arbitrary information per trip, which had not been possible so far; a low inhibition level and therefore customer-value-related functions and business models. It opens up new business fields and a brand integration in the life style of the respective customer. In addition, it may contribute to benefitting the customer by supplying improved information. For example, no active intervention has to take place when a person is not aware of a lack of information, but the mobility device presents the corresponding information in an unassuming manner. In addition, the driver can also be prepared for a trip. Vehicle information for authorized third parties can be offered. A simple communication can be carried out with the driver or vehicle. A good fleet management can be carried out. The entry threshold is very low. An expandable basic module may exist—charging of cell phone, weather station, domestic engineering—.

Furthermore, as required, an early activation of an onboard electronic system of the vehicle can take place before a trip. In addition, comfort functions can be activated, such as air conditioner, seat heaters, seat position and the like. In this manner, a confirmation of the driving destination can also take place. An identification of the probable driver can be made. An activation and connection to online services can also take place, which may include an authorization and/or authentication. Privacy settings can be implemented, for example, for personal and business travel, access can be granted to corresponding email accounts and/or telephone directories and/or addresses or histories can be displayed. In addition, so-called valet parking becomes possible.

The mobility device can further be designed for preparing the driver for the trip. In this context, it can, for example, provide updated traffic information, weather information and other information; moreover, information concerning the position of the respective vehicle; a system condition, for example, of operating supplies, such as engine oil. In addition, a suggested departure time can be communicated to the driver with a view to the destination to be reached and/or the expected arrival time. A reminder can also be provided, for example, with respect to an umbrella, a mobile terminal and/or a purse and/or active accessories.

Vehicle information for authorized third parties can also be offered; thus, within the scope of a fleet management, for example, an expected arrival time for a vehicle return in the case of a follow-up trip. Furthermore, a connection is also established in this manner, for example, between the family and the driver, and questions can therefore be answered, such as When is Daddy coming home?
Made it to the appointment?
Stuck in traffic?
Can do more shopping?
Videochat (uni- or bidirectional)
Voice mail
Reaching of checkpoints
Glympse

LIST OF REFERENCE NUMBERS

1 Production device
3 Mobility device
5 Interface
7 Backend server
9 RFID sensor (alternative/in addition NFC)
11 Optical person detection unit
13 Key reader
15 Key
17 Vehicle
19 Imaging device (monitor)
21 First graphic object
23 Second graphic object
25 Third graphic object The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a computer program product for a mobile device, the method comprising the acts of:
   providing one or more graphic objects;
   providing one or more state variables that are assignable to a respective one of the one or more graphic objects, each state variable associating a perceivable characteristic to the graphic object to which it is assigned;
   providing one or more vehicle parameters or personal characteristics;
   assigning at least one of the state variables to the respective one of the one or more graphic objects as a function of a user input;
   assigning, as a function of the user input, a respective vehicle parameter or personal characteristic to one of the at least one state variables, respectively, which at least one state variable is assigned to the respective one of the one or more graphic objects, wherein said assigning the respective vehicle parameter or personal characteristic comprises a respective assignment function that represents an imaging rule of the respective vehicle parameter or personal characteristic onto the respective state variable; and
   generating the computer program product in an automated manner, wherein the computer program product is configured to generate a signalizing signal during execution, which signalizing signal is a function of a respective currently-provided value of the respective vehicle parameter or personal characteristic, which is assigned to the respective one of the one or more graphic objects, and which signalizing signal is configured for signalizing the one or more graphic objects corresponding to the respective assignment function relative to the respective currently-provided value of the respective vehicle parameter or personal characteristic on an imaging system.

2. A method for producing a computer program product for a mobile device, the method comprising the acts of:
   providing one or more three-dimensional objects;

providing one or more state variables that are assignable to a respective one of the one or more three-dimensional objects, each state variable associating a perceivable characteristic to the three-dimensional object to which it is assigned;

providing one or more vehicle parameters and/or personal characteristics;

assigning at least one of the state variables to the respective one of the one or more three-dimensional objects as a function of a user input;

assigning, as a function of the user input, a respective vehicle parameter or personal characteristic to one of the at least one state variables, respectively, which at least one state variable is assigned to the respective one of the one or more three-dimensional objects, wherein said assigning the respective vehicle parameter or personal characteristic comprises a respective assignment function that represents an imaging rule of the respective vehicle parameter or personal characteristic onto the respective state variable; and generating the computer program product in an automated manner, wherein the computer program product is configured to generate a control signal during execution, which control signal is a function of a respective currently-provided value of the respective vehicle parameter or personal characteristic, which is assigned to the respective one of the one or more three-dimensional objects, and which control signal is configured for controlling the one or more three-dimensional objects corresponding to the respective assignment function relative to the respective currently-provided value of the respective vehicle parameter or personal characteristic.

3. A method for producing a computer program product for a mobile device, wherein the method comprises the acts of:

providing one or more audio objects;

providing one or more state variables that are assignable to a respective one of the one or more audio objects, each state variable associating a perceivable characteristic to the audio object to which it is assigned;

providing one or more vehicle parameters and/or personal characteristics;

assigning at least one of the state variables to the respective one of the one or more audio objects as a function of a user input;

assigning, as a function of the user input, a respective vehicle parameter or personal characteristic to one of the at least one state variable, respectively, which at least one state variable is assigned to the respective one of the one or more audio objects, wherein said assigning of the respective vehicle parameter or personal characteristic comprises a respective assignment function, which represents an imaging rule of the respective vehicle parameter or personal characteristic onto the respective state variable; and generating the computer program product in an automated manner, wherein the computer program product is configured to generate a signalizing signal during its operation, which signalizing signal is a function of a respective currently-provided value of the respective vehicle parameter or personal characteristic, which is assigned to the respective one of the one or more audio objects, and which signalizing signal is configured for signalizing the one or more audio objects corresponding to the respective assignment function relative to the respective currently-provided value of the respective vehicle parameter or personal characteristic by a sound-providing device.

4. A method for producing a computer program product for a mobile device, the method comprising the acts of:

providing one or more light objects;

providing one or more state variables that are assignable to a respective one of the one or more light objects, each state variable associating a perceivable characteristic to the light object to which it is assigned;

providing one or more vehicle parameters and/or personal characteristics are provided;

assigning at least one of the state variables to the respective one of the one or more light objects as a function of a user input;

assigning, as a function of the user input, a respective vehicle parameter or personal characteristic to one of the one or more state variables, respectively, which at least one state variable is assigned to the respective one or more of the light objects, wherein said assigning of the respective vehicle parameter or personal characteristic comprises a respective assignment function that represents an imaging rule of the respective vehicle parameter or personal characteristic onto the respective state variable; and generating the computer program product in an automated manner, wherein the computer program product is configured to generate a signalizing signal during execution, which signalizing signal is a function of a respective currently-provided value of the respective vehicle parameter or personal characteristic, which is assigned to the respective one of the one or more light objects, and which signalizing signal is configured for signalizing the one or more light objects corresponding to the respective assignment function relative to the respective currently provided value of the respective vehicle parameter or personal characteristic by a light-generating device.

5. The method according to claim 1, wherein the respective assignment function comprises at least one function parameter, which is determined in an automated manner as a function of respective value domains of the respective state variable and of the respective vehicle parameter or personal characteristic.

6. The method according to claim 2, wherein the respective assignment function comprises at least one function parameter, which is determined in an automated manner as a function of respective value domains of the respective state variable and of the respective vehicle parameter or personal characteristic.

7. The method according to claim 3, wherein the respective assignment function comprises at least one function parameter, which is determined in an automated manner as a function of respective value domains of the respective state variable and of the respective vehicle parameter or personal characteristic.

8. The method according to claim 4, wherein the respective assignment function comprises at least one function parameter, which is determined in an automated manner as a function of respective value domains of the respective state variable and of the respective vehicle parameter or personal characteristic.

9. The method according to claim 1, wherein the respective assignment function comprises at least one function parameter which is specified as a function of a user input, and wherein the method further comprises checking whether a respective value domain of the respective vehicle parameter or personal characteristic is imaged within a value domain of the respective state variable by the respective assignment function and, only if so, classifying the at least one function parameter as being valid.

10. The method according to claim 2, wherein the respective assignment function comprises at least one function parameter which is specified as a function of a user input, and wherein the method further comprises checking whether a respective value domain of the respective vehicle parameter or personal characteristic is imaged within a value domain of the respective state variable by the respective assignment function and, only if so, classifying the at least one function parameter as being valid.

11. The method according to claim 3, wherein the respective assignment function comprises at least one function parameter which is specified as a function of a user input, and wherein the method further comprises checking whether a respective value domain of the respective vehicle parameter or personal characteristic is imaged within a value domain of the respective state variable by the respective assignment function and, only if so, classifying the at least one function parameter as being valid.

12. The method according to claim 4, wherein the respective assignment function comprises at least one function parameter which is specified as a function of a user input, and wherein the method further comprises checking whether a respective value domain of the respective vehicle parameter or personal characteristic is imaged within a value domain of the respective state variable by the respective assignment function and, only if so, classifying the at least one function parameter as being valid.

13. The method according to claim 1, wherein the respective vehicle parameter is representative of either a position of the vehicle, or a distance of the vehicle from a reference position, or a charging state, or a vehicle status and or an operating variable of the vehicle.

14. The method according to claim 2, wherein the respective vehicle parameter is representative of either a position of the vehicle, or a distance of the vehicle from a reference position, or a charging state, or a vehicle status and or an operating variable of the vehicle.

15. The method according to claim 3, wherein the respective vehicle parameter is representative of either a position of the vehicle, or a distance of the vehicle from a reference position, or a charging state, or a vehicle status and or an operating variable of the vehicle.

16. The method according to claim 4, wherein the respective vehicle parameter is representative of either a position of the vehicle, or a distance of the vehicle from a reference position, or a charging state, or a vehicle status and or an operating variable of the vehicle.

17. The method according to claim 1, wherein the respective personal characteristic is representative of a position of a respective person.

18. The method according to claim 2, wherein the respective personal characteristic is representative of a position of a respective person.

19. The method according to claim 3, wherein the respective personal characteristic is representative of a position of a respective person.

20. The method according to claim 4, wherein the respective personal characteristic is representative of a position of a respective person.

* * * * *